United States Patent

Nagata

[15] 3,659,159

[45] Apr. 25, 1972

[54] OPTOELECTRONIC DISPLAY PANEL

[72] Inventor: Minoru Nagata, 1558 Josuchoncho, Kodaira-shi, Tokyo, Japan

[22] Filed: Oct. 14, 1970

[21] Appl. No.: 80,621

Related U.S. Application Data

[62] Division of Ser. No. 679,021, Oct. 30, 1967, Pat. No. 3,560,750.

[30] Foreign Application Priority Data

Oct. 31, 1966 Japan....................................41/71372

[52] U.S. Cl.......................317/235 R, 317/235 N, 317/235 L, 317/235 D, 250/211 J, 250/213, 307/311

[51] Int. Cl.........................................H01l 15/00, H01l 17/00

[58] Field of Search...................307/311; 317/235 N, 235 D, 317/235 L; 250/213, 211 J

[56] References Cited

UNITED STATES PATENTS

| | | | |
|---|---|---|---|
| 3,486,029 | 12/1969 | Barrett | 250/217 |
| 3,037,189 | 5/1962 | Barrett | 340/166 |
| 3,479,517 | 11/1909 | Bray | 250/213 |
| 3,535,532 | 10/1970 | Merryman | 250/217 |
| 3,458,703 | 7/1969 | Migitaka | 250/199 |

OTHER PUBLICATIONS

Masetti; I.B.M. Tech. Disclosure Bull. Vol. 4, No. 12, May 1962, page 71.

Kazan; Proceedings of the I.R.E., December 1955, pp. 1888–1955.

Lynch et al., I.B.M. Tech. Discl. Bull., Vol. 8, No. 1, June 1965.

*Primary Examiner*—John W. Huckert
*Assistant Examiner*—Martin H. Edlow
*Attorney*—Craig, Antonelli, Stewart and Hill

[57] ABSTRACT

An optoelectronic amplifier in which a light-receiving element, such as a photoconductive element, a light-emissive element, such as a PN junction light emitter, and a negative resistance element, such as tunnel diode, are suitably combined to form a system wherein an input light signal is received and converted into an electrical signal by the light-receiving element, and the negative resistance element is controlled by the converted electrical signal to switch the light-emissive element on and off whereby an amplified light signal is emitted from the light-emissive element.

17 Claims, 19 Drawing Figures

Patented April 25, 1972

3,659,159

4 Sheets-Sheet 1

INVENTOR
MINORU NAGATA

BY Craig, Antonelli, Stewart & Hill

ATTORNEYS

OPTOELECTRONIC DISPLAY PANEL

This is a divisional application of Ser. No. 679,021, filed Oct. 30, 1967, now U.S. Pat. No. 3,560,750.

This invention relates generally to an optoelectronic amplifier, and more particularly to improvements in devices in which an optical signal is amplified after having once been converted into an electrical signal.

Recently, signal transmission effected by way of light has been markedly advanced in the field of pulse transmission technology. In this type of optical communication system, an electrical signal to be transmitted is first converted into an optical signal by means of a light-emissive diode or similar means and, thereafter, the resultant optical signal is sent out to a receiving terminal or repeating station. A light-detecting diode is provided at the repeating station, whereby said optical signal is once more converted into an electrical signal and then is shaped and/or amplified by means of an electrical amplifier. The output of this amplifier is applied to the light-emissive diode, whereby an amplified optical signal is again obtained.

The optical communication system, such as mentioned above, has its primary advantage in the following points:

1. Transmission/reception is made available between plural diverse systems, e.g., among systems which have mutually different potentials to ground.
2. Because of the inherent nature of light, there is freedom with respect to the direction of transmission.
3. Transmission speed is high.

On the other hand, several disadvantageous points are involved therein, such as:

1. Efficiency of the light-emissive element is low and, as a result, an amplifier of large gain must be provided is association therewith. Practically, an amplification factor of 10 to 100 or more is required; in consequence, it becomes necessary to provide several stages of amplification.
2. Response time is restricted due to existence of the amplifier. In other words, the response time of the amplifier is long despite the fact that the respective response times of the light-emissive diode and the light-detecting diode can be as little as $10^{-8}$ to $10^{-10}$ seconds. Therefore, the response time on the whole is restricted to $10^{-6}$ to $10^{-7}$ seconds.
3. A considerable amount of power is needed because of use of the amplifier.
4. In addition, the usual optoelectronic amplifier has no accumulation effect and, therefore, an adequate memory circuit must be provided therein if information is to be retained for a certain period.

As described, the optical communication system has various advantages. For practical applications, however, use of an amplifier or memory circuit therewith becomes necessary. In this regard, it has been extremely difficult to realize a practical device in which a conventional optoelectronic amplifier is used. For an accumulation effect, another optoelectronic amplifier which associated a flip-flop circuit in combination with a light-emissive element may be considered. This amplifier, however, is complicated in its circuit composition, and not satisfactory from the point of view of response time.

In improving said conventional systems, one object of this invention is to provide an improved optoelectronic amplifier of small size and simple structure having a short response time and including a pulse shaping function.

Another object of this invention is to provide an optoelectronic amplifier having accumulation effect.

Still another object of this invention is to provide an optoelectronic amplifier which can be used as a display device.

An additional object of this invention is to provide an optoelectronic display device having a matrix of semiconductor elements.

It is also an object of this invention to provide a method for making the semiconductor elements employed in the matrix of the display device.

These and additional objects and advantages of the present invention will become more apparent from the following description when taken in connection with the accompanying drawing wherein:

FIG. 1*a* shows a circuit diagram of a conventional switching circuit using a tunnel diode;

FIG. 1*b* shows a basic circuit diagram of the optoelectronic amplifier of the present invention;

Figures 1A, 1B, 2:
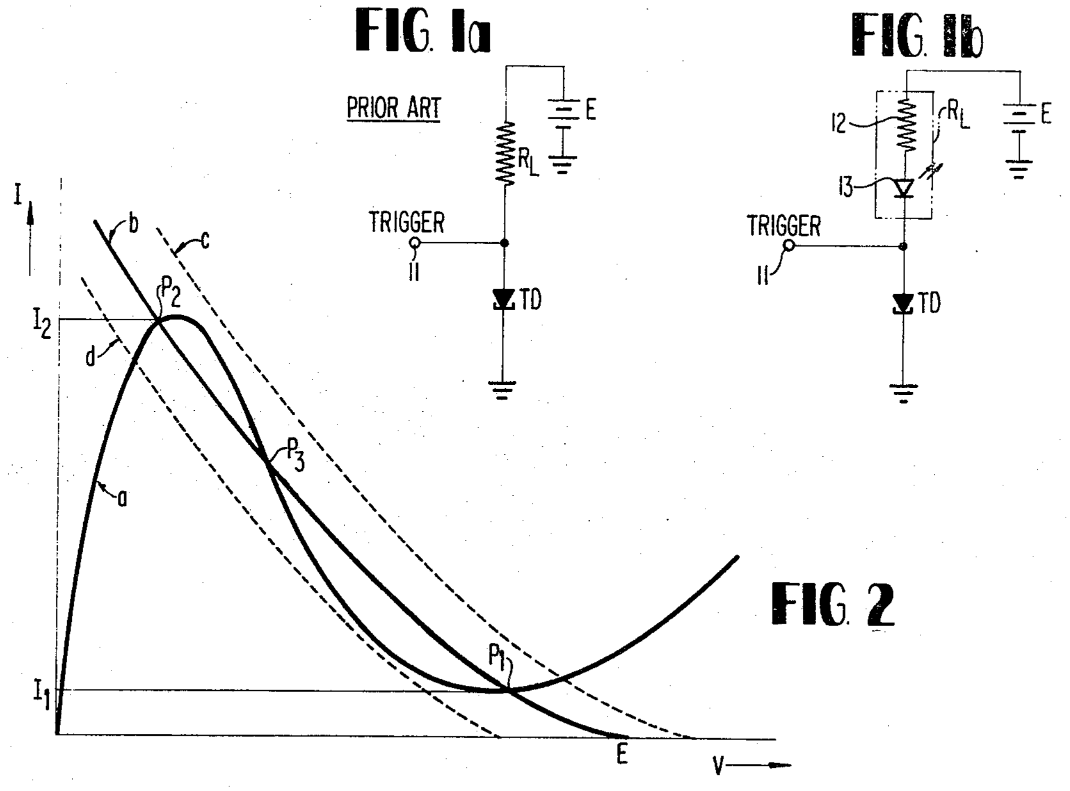
FIG. 2 is a characteristic diagram for illustrating the principle of the present invention.
Figure 8:
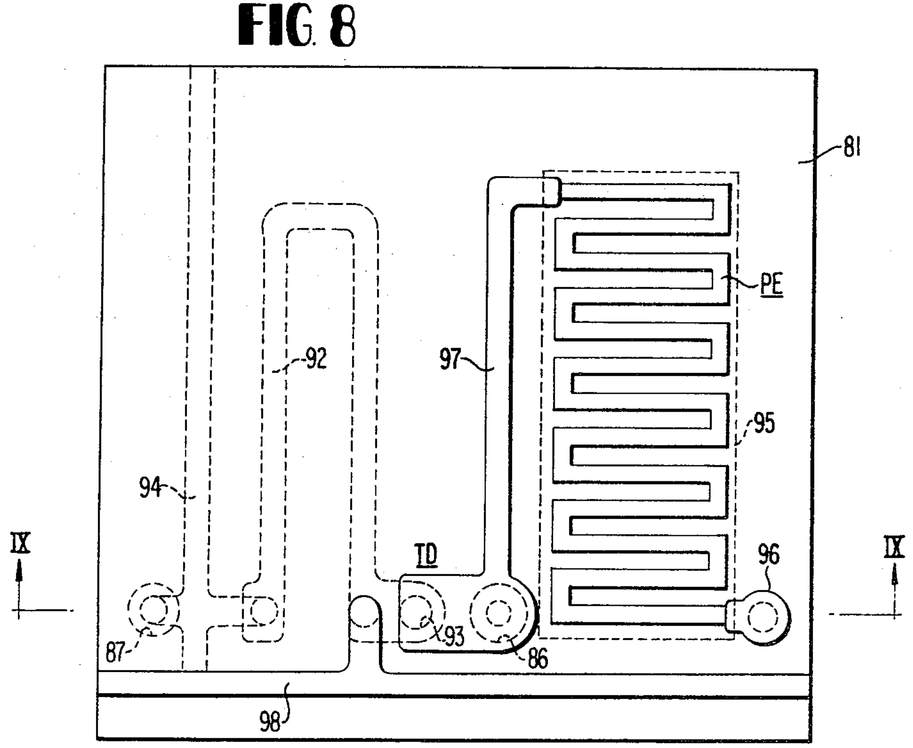
FIG. 8 is a plane view of the device of FIG. 6.

FIG. 9 is a sectional view taken along line IX—IX of FIG. 8 illustrating the manufacturing process of the invention, It is known in the art that a tunnel diode can be used as an electric switching element, and FIG. 1*a* shows an example of a switching circuit in which a tunnel diode is so used. The tunnel diode TD is connected to the direct current electric source E via a load resistor $R_L$. When a trigger current is applied from the terminal 11 to said tunnel diode TD, the conductive state of said diode is suddenly changed and, as a result, the current flowing in the load resistor $R_L$ is remarkably changed by this relatively small trigger current.

A circuit diagram of this invention is illustrated in FIG. 1*b*, wherein: a series circuit, comprising an auxiliary resistor 12 and a PN junction light emitter (laser diode) 13, functioning as the load $R_L$, is used. As the light emitter 13, a semiconductor, such as GaAs (gallium-arsenite) or GaP (gallium-phosphate), or other III–V semiconductor is most suitable.

In devices having the composition as described above, the operation may be understood by reference to the characteristic curves shown in FIG. 2, wherein the voltage V vs. current I characteristic of the tunnel diode TD is shown by the curve *a*. The load line of the circuit is represented by the curve *b*. This load line *b* crosses the characteristic curve *a* of the tunnel diode TD, at the points $P_1$, $P_2$ and $P_3$. Therefore, this circuit may operate as a bistable circuit whose stable points are at $P_1$ and $P_2$. To establish such a bistable circuit, the resistance value of the bias circuit must be large in comparison with the absolute value of the negative resistance of said tunnel diode. Practically, therefore, an auxiliary resistor 12 is inserted therein. For this purpose, however, the forward directional resistance of the light emitter 13 is good enough. If the tunnel diode and the laser diode are produced using the same semiconductor material, the auxiliary resistor 12 is not needed at all. By the use of the materials GaAs, for example, two diodes having equally excellent characteristics can be made practically available. As a result, the combination of these diodes can be most adequately suited for practical applications.

Figures 3, 4, 5:
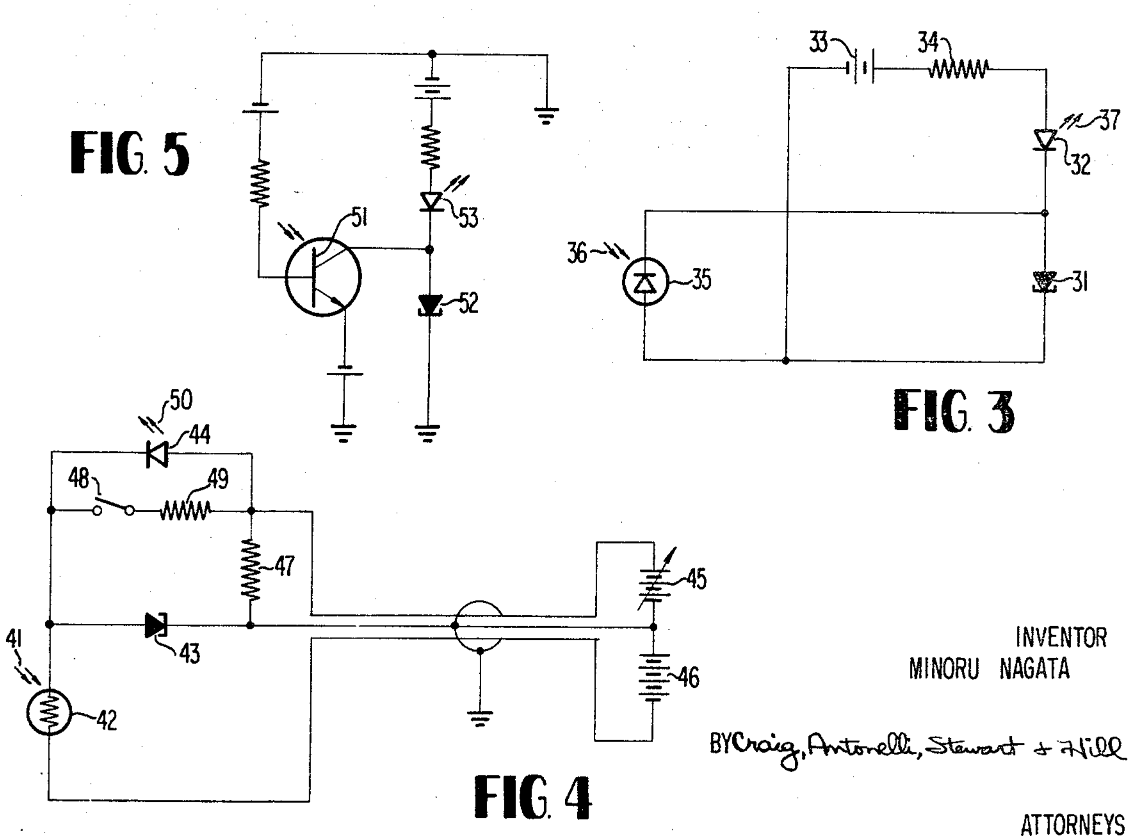
FIG. 3 is a circuit diagram of one embodiment of the present invention.
FIGS. 4 and 5 are circuits diagrams of different embodiments of the present invention.

FIG. 3 shows an embodiment of this invention, in which the switching circuit as in FIG. 1*b* is used. Referring to FIG. 3, a tunnel diode 31 is connected in series with a light emitter 32 and a power source 33 through an auxiliary resistor 34, and a photo-diode 35 is connected to the ends of the tunnel diode 31 so as to be biased in the reverse direction with respect to the power source 33.

Assume that the operating point of the circuit exists at $P_1$ of FIG. 2. Concurrently, when the resistance value of the photo-diode 35 is reduced by the act of an input light 36, the current flowing into the tunnel diode 31 is reduced. As a result, the operating point of the tunnel diode is passed over the bottom of the curve *a* and, as a result, switching action occurs at the tunnel diode 31, and the operating point is shifted to another stable point $P_2$. Accordingly, the current flowing in the light emitter 32 is changed from $I_1$ to $I_2$. While, if a current pulse whose magnitude is such that it exceeds the peak of the curve *a* is given to the tunnel diode by changing the input light, the operating point is shifted from the stable point $P_2$ to $P_1$. As a result of this action, the current flowing in the light emitter 32 is changed from $I_2$ to $I_1$. The light emitter 32 is illuminated only when the operating point of the circuit is at $P_2$.

The current pulse generated at the element 35 of FIG. 3, by which the tunnel diode 31 is switched, is determined according to the positions of the stable points $P_1$ and $P_2$ and also the characteristic curve of the light emitter 32, i.e., the tilt of the load curve *b*. Thus, the magnitude of said current pulse can be reduced from one-tenth to one one-hundredth of that of ( $I_2 - I_1$ ). The switching action of the tunnel diode in its operating scope from the stable points $P_1$ to $P_2$ is performed as shortly as $10^{-8}$ to $10^{-10}$ seconds. Therefore, the optoelectronic amplifier of this invention has a pulse shaping function, and serves as a high speed switching circuit having a current conversion factor of 10 to 100 times.

The circuit of FIG. 3 is featured by the fact that it can be readily composed by suitably combining the characteristics of photodiode and the tunnel diode. Also, said optoelectronic amplifier can be operated as a memory circuit by suitably biasing in the manner described above wherein two stable points are determined at $P_1$ and $P_2$, respectively. For example, when the bias is determined so that the stable point $P_1$ is positioned near the bottom of the curve *a* and $P_2$ is positioned at a considerably lower point than that of the peak value of the curve *a*, the switching action is effected at the stable point $P_1$ by a small input, and the current flowing in the light emitter is increased from $I_1$ to $I_2$. In this way, the operating point is shifted to the stable point $P_2$. In this operation, since the operating point is not switched from $P_2$ to $P_1$ unless a large input signal is turned up at the stable point $P_2$, the circuit is stabilized at the stable point $P_2$ and, as a result, the information given by the input signal light 36 is stored therein for a long period. This information can be read out as a light signal and can be erased if necessary, by temporarily increasing the power source voltage or by temporarily short-circuiting the light emitter.

As shown by the curves *c* and *d* in FIG. 2, the load line can be set so that it crosses the characteristic curve *a* of the tunnel diode only at one point i.e., the stable point. In this case, said circuit is operated as a monostable circuit, and functions to amplify the input signal and to shape the waveform thereof, but has no memory capability. In addition, self-oscillation can be activated by setting the operating point at the negative resistance region.

As has been described, the circuit of this invention performs the functions of amplifying the input light signal and shaping the waveforms thereof and, by adjusting the bias of the circuit, an optoelectronic amplifier having memory function can be obtained also.

FIG. 4 illustrates an embodiment of this invention, including an input light 41, a photoelectric conversion element 42 consisting of a photo-conductive material, such as CdS or CdSe, and a tunnel diode 43 of GaAs semiconductor. These elements are driven from a power source 46. In addition a GaP PN junction light emitter (laser element) 44 and a stabilizer resistor 47 are provided by which the impedance of said tunnel diode is adjusted to prevent occurrence of parasitic oscillation. A variable bias power source 45 is also provided so that by variation of the bias provided to the tunnel diode, the circuit can be adjusted to operate either as a monostable circuit or a bistable circuit. A switch 48 connected in series with a protective resistor 49 is used to erase the memorized information by short-circuiting the light emitter 44 in case the circuit is used as a bistable circuit, and 50 is the resulting output light from light emitter 44.

The operation of the circuit of FIG. 4 is the same as that of FIG. 3 as previously explained, wherein, the input light 41 is converted into a current by the conversion element 42 and, as a result, the tunnel diode 43 is switched. Accordingly, the current flowing in the light emitter 44 is increased, and the output light 50 which has been amplified with respect to the input light 41 is obtained. When the bias voltage is suitably selected through use of the variable power source 45 and the load characteristic curve of the circuit is arranged to conform to the curves *c* or *d*, as shown in FIG. 2, the circuit woll be transformed into a monostable circuit; however, when said load characteristic conforms the curve *b*, the circuit will be transformed into a bistable circuit having an amplifying function, a waveform shaping function, and a memory function.

A photo-transistor or solar battery may be used as a photoelectric conversion element. A photo-diode is advantageous due to its quick-response characteristic, and a photo-transistor particularly useful because of its large amplification factor.

FIG. 5 is a circuit diagram showing another embodiment of this invention, including a photo-transistor 51, a tunnel diode 52 and a light emitter 53. Since this circuit utilizes a phototransistor as the photoelectrical conversion element, the circuit is operated by a minute amount of light and, therefore, the sensitivity of the circuit is extremely high.

Figure 6:
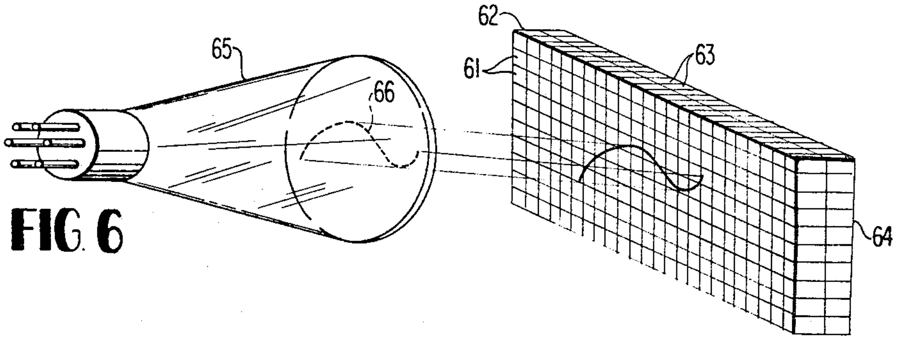
FIG. 6 is a schematic diagram illustrating one modification of the present invention.

The optoelectronic amplifier of this invention can be formed into a solid state display device by combining a plurality of said elements into one body. FIG. 6 shows an example of such a display device. This display device consists of an image-receiving panel 62 on which a number of photo-electric conversion elements 61, such as photo-conductive elements, are disposed in matrix form; a display panel 64 on which a number of light emitters (laser diodes) 63 are disposed in matrix form opposite to respective photoelectric conversion elements on the image-receiving panel 62 and; a number of tunnel diodes (not shown in the figure) which have a switching function and are disposed in matrix form between said image-receiving panel 62 and said display panel 64. The numeral 65 designates an image display device such as a cathode-ray tube.

The operation of the circuit of FIG. 6 will hereafter be explained. Assume that a certain waveform 66 is traced on the face of the cathode-ray tube 65. Said waveform is projected onto the image-receiving panel 62 whereby the respective photo-conductive elements 61 illuminated by said waveform are actuated. Accordingly, the respective light emitters 63 of the display panel 64 corresponding to said photo-conductive elements 61 are illuminated, whereby the same waveform as generated by the cathode-ray tube is amplified and reproduced. Although no detail is shown in the figure, the waveform on the solid state display device remains as it is by suitably selecting the bias voltage through means of the power source and by making the circuit operate in the bistable state, even after the waveform is removed from the cathode-ray tube. This solid state display device, because of its structure, can be formed also by utilizing integrated circuit techniques. The solid state display device thus formed is small in size and is applicable for many uses. For example, it will become possible to intensify images on the cathode-ray tube, store images (electron photography), reverse black/white of images, and so forth.

By interposing the light-receiving elements and the light-emissive elements, a logic operation, e.g., logic computation providing functions such as performed by an AND circuit or an OR circuit, in which the light-emissive element is illuminated by two input lights. Further, by adjusting the dimensions of the light-receiving elements and light-emissive elements, the image can be enlarged or contracted. An example of the method for constructing a display device by the use of integrated circuit techniques will be explained herein below.

Figure 7:
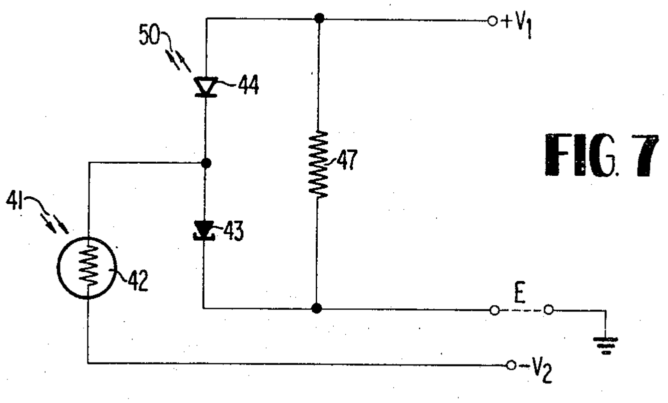
FIG. 7 is a circuit diagram of a unit circuit included in the device shown in FIG. 6.

The optoelectronic amplifier, as shown in FIG. 4, can be simplified, as shown in FIG. 7. The notations indicated in FIG. 7 are identical to those used for corresponding elements in FIG. 4. In this example, the short-circuit made up of switch 48 and resistor 49 in FIG. 4 is omitted. Therefore, the operating point of the switching circuit and the erasure of the memorized information are controlled by suitably changing the power source voltage $+V_1$ or $-V_2$.

A display device, as shown in FIG. 6, can be obtained through an arrangement in which a number of the unit circuits as mentioned above, are formed on a semiconductor base. For simplification of explanation of the manufacturing process of said display device, one single unit circuit will be explained.

FIG. 8 is a plane view showing a complete unit circuit. FIG. 9*a* through 9*j* are sectional views taken along line IX—IX of the unit circuit in FIG. 8 at various stages of manufacture by which the manufacturing process is illustrated. Although only one unit is shown in the figure, the manufacturing process is applied to many points at the same time on a semiconductor base thereby constituting a complete device.

First, a P-type semiconductor substrate 81 comprising a single crystal of gallium-phosphide (GaP) or gallium-arsenide (GaAs) or a mixed crystal of GaP and GaAs is to be provided. Insulating layers 82 and 83 ($SiO_2$ pr $SiN_4$) are formed on both surfaces of the substrate in a known manner. (FIG. 9*a*) Two portions of said insulating layers having a specific interval are removed to expose the relevant surfaces of the substrate 81. These portions are shown by the holes 84 and 85 in FIG. 9*b*. An N-type impurity for example, Te Se, Sb, etc., is diffused into both surfaces of said substrate via the holes 84 and 85 in a known manner thereby forming strong N-type isolations as shown by the numerals 86 and 87 in FIG. 8 and 9*b*, respectively.

Figure 9A:
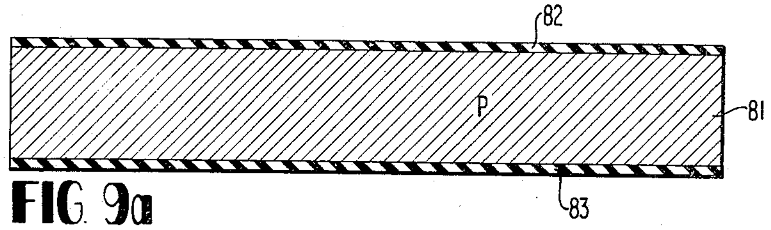
Figure 9B:
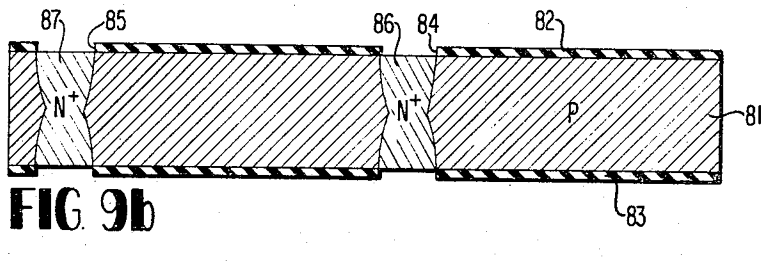
Figure 9C:
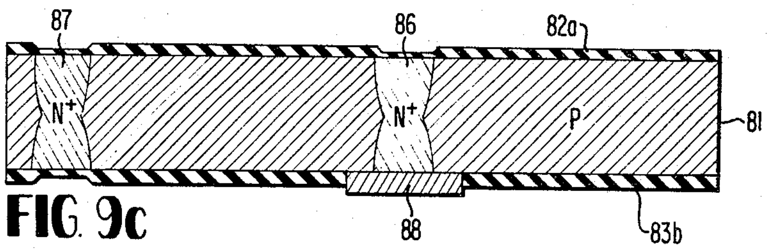
Figure 9D:
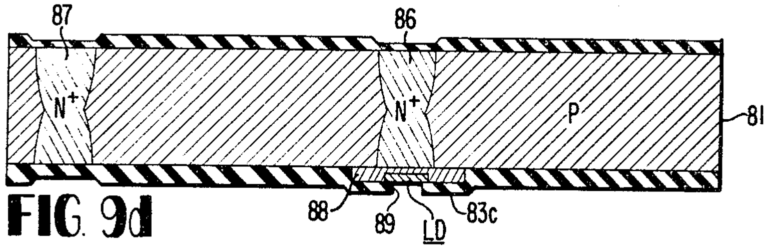
Figure 9E:
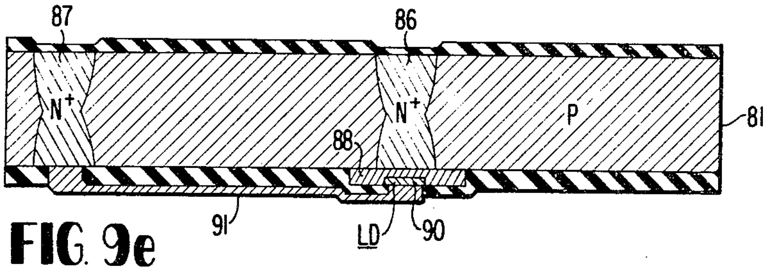

Further, insulating layers are additionally formed on both the surfaces of said substrate. Such layers are shown respectively by the numerals **82*a* and 83*b*** in FIG. 9*c*. A part of the insulating layer on the bottom surface of the substrate corresponding to one isolation region 86 is removed and, an epitaxial layer 88 of P-type material is grown in this region. (FIG. 9*c*) Further, an insulating layer **83*c* is formed at least on the surface of the epitaxial layer 88 in which a hole 89 is formed, and a P-type impurity, e.g., Zn, is diffused whereby a dense P-type layer 90 is formed within the epitaxial layer 88** (FIG. 9*d*). Thus, a laser-diode LD is formed on the bottom surface of the substrate. The P-type layer 90 is electrically connected with the other isolation region 87 by way of a coating layer 91 obtained by selectively vaporizing a conductive material such as aluminum (FIG. 9*e*).

Figure 9F:
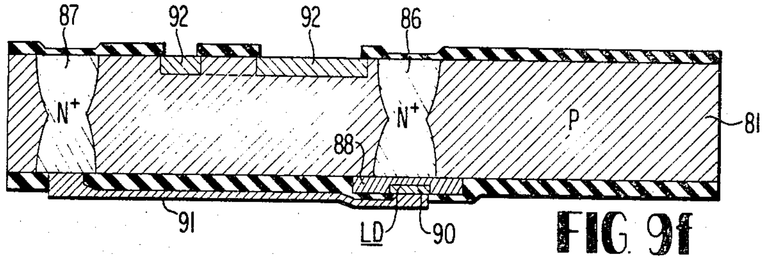
Figure 9G:
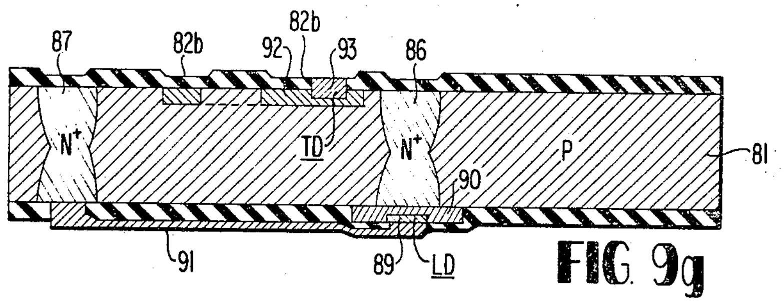
Figure 9H:
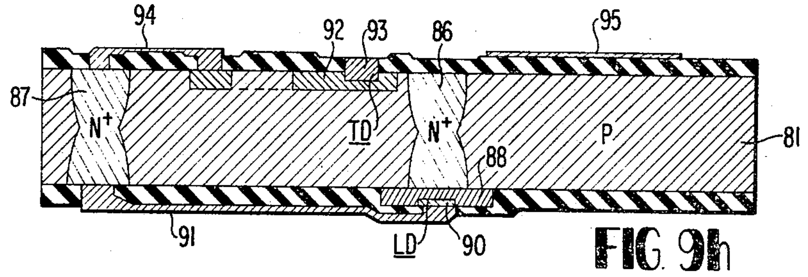

The insulating layer on the upper surface of the substrate 81 located between two adjacent isolation regions 86 and 87 is selectively removed and, through the portion thus formed, an N-type impurity is diffused therein whereby a resistive layer 92 of a long U-shape is formed (FIGS. 8 and 9*f*). Further, an insulating layer **82*b* is formed on the upper surface of the substrate 81. In the vicinity of one end of the resistive layer 92, a P-type impurity, such as Zn, is deposited to be alloyed with the resistive layer 92 thereby forming a P-type layer 93**. Thus a tunnel diode TD is constituted on the substrate (FIGS. 8 and 9*g*). The other end of the resistive layer 92 is electrically connected with the upper surface of the other isolation region 87 via a selectively vaporized conductive material such as aluminum, as shown by the numeral 94 in FIGS. 8 and 9*h*. As shown in FIG. 8, the conductive layer 94 is extended longitudinally and connected with other adjacent units (not shown in the figure ).

Figure 9I:
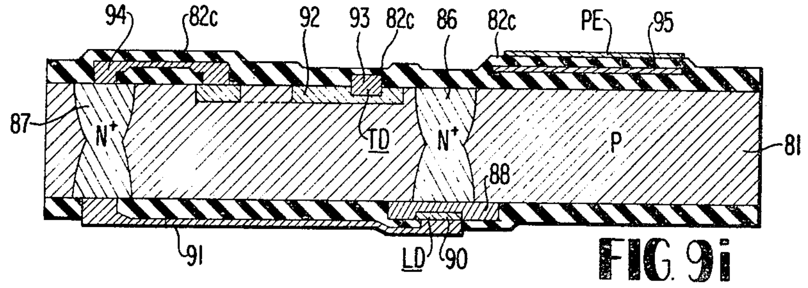

An aluminum coating 95 is applied to an area on the upper surface of the substrate 81. This coating is used for light shielding purposes. Subsequently, an insulating layer **82*c* is additionally formed on the whole of the upper surface of the substrate 81** ( FIG. 9*i*). A photo-conductive material such as CdS is then vaporized onto the upper part above said aluminum shield 95, by which a photo-conductive element PE is constituted (FIGS. 8 and 9*i*).

Figure 9J:
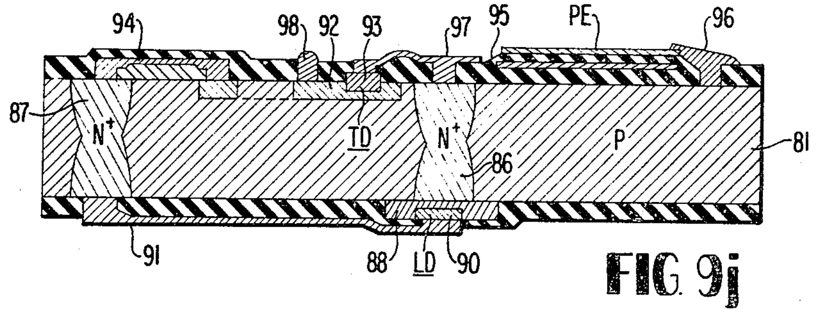

Lastly, conductive layers 96, 97 and 98 are selectively vaporized thereon (FIGS. 8 and 9*j*). The conductive layer 96 serves to connect one end of said photo-conductive element PE to the substrate 81. The layer 97 serves to connect mutually the other end of said element PE, the P-type layer 93 of the tunnel diode TE and the isolation region 86. The layer 98 acts as the terminal on the side of the tunnel diode TD of the resistive layer 92 and serves to extend the surface of the substrate to establish connections with other units ( See FIG. 8).

The substrate 81 of the display unit thus formed is held at ground potential, and the conductive layers 98 and 94 are held at a positive potential $+ V_1$ and a negative potential $- V_2$, respectively, although the actual connection to the source of voltage is not shown in the figure. Since the isolation regions 86 and 87 can be held at a positive potential with respect to the ground potential of substrate 81, these regions are operated as a conductor in such a manner that they are isolated from the substrate 81. Further, these regions serve to connect electrically the respective components of the circuit with each other. By thus arranging the construction, a circuit equivalent to that in FIG. 7 can be obtained.

The device according to this invention, as has been specifically described, can be formed with a simple circuit and into a smaller size than the conventional devices. In addition, in contrast to the conventional device in which the response time is about 0.1 to 0.5$\mu$ sec. because of the need for use of multistage amplifier, the device of the present invention makes available as short a response time as about 0.1$\mu$ sec. Further, the device of this invention does not require a separate memory circuit unlike the conventional device, because, by suitably adjusting the bias voltage of the circuit provided in accordance with the invention, a memory function can be obtained. Therefore, a vacuum or high voltage, such as required in the case of memory cathode-ray tubes, can be omitted therefrom.

While the principles of the invention have been described above in connection with specific embodiments along with practically useful applications thereof, and particular modifications thereof, it is to be clearly understood that this description is provided only by way of example and not as a limitation on the scope of the invention.

I have shown and described several embodiments in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

I claim:

1. A solid state display device comprising:

an image-receiving panel including a plurality of photo-conductive elements disposed on one surface thereof in matrix form;

a display panel arranged on the other side of said image-receiving panel, and including a plurality of PN junction light emitters disposed in matrix form in corresponding positions to said photo-conductive elements;

a plurality of tunnel diodes, each of which is connected in series with a respective one of said PN junction light emitters;

means for connecting one terminal of each of the respective photo-conductive elements to the junction point of a respective tunnel diode and PN light emitter combination; and means for electrically connecting to the other terminal of the respective photo-conductive elements and the other terminal of said PN junction light emitters and tunnel diodes opposite to the ends forming the junction points thereof from outside said display device.

2. The solid state display device according to claim 1, wherein said photo-conductive elements, PN junction light emitters and tunnel diodes are formed on separate portions of a single semiconductor substrate.

3. A solid state display device comprising:

a display panel including a plurality of light-emissive elements disposed on one surface thereof in matrix form;

a plurality of negative resistance elements, each of which is connected in series with each of said light-emissive elements, respectively;

an image-receiving panel arranged on the opposite side against said one surface of said image-receiving panel, and including a plurality of photo-electric conversion elements disposed in matrix form in corresponding positions to said light-emissive elements, said photo-electric conversion elements being coupled respectively to said negative resistance elements for operatively switching said negative resistance elements; and a DC power source for supplying electric power to respective series circuits of said light-emissive elements and said negative resistance elements.

4. A solid state display device comprising:

a semiconductor body having a first conductivity type;

a plurality of light-emissive elements disposed on one surface of said semiconductor body in matrix form, to thereby form a display panel;

a plurality of photo-electric conversion elements disposed on the other surface opposite to said one surface of said semiconductor body in matrix form to thereby form an image-receiving panel;

a plurality of isolated semiconductive regions each having a second conductivity type opposite to said first conductivity type and formed in elongated fashion in said semiconductor body from said one surface to said opposite surface thereof, each of said isolated semiconductive regions electrically connecting each of said light-emissive elements to each of said photoelectric conversion elements, respectively;

a plurality of negative resistance elements disposed on one surface of said semiconductor body; conductive leads formed on an insulator layer for covering said one surface of said semiconductor body, each of said leads connecting one of said light-emissive elements to one of said negative resistance elements, respectively; and a DC power source for supplying electric power to said respective series circuits of said light-emissive elements and said negative resistance elements.

5. A solid state display device according to claim 4, wherein said respective light-emissive elements are comprised of a diode having a PN junction which is formed in said semiconductor body.

6. A solid state display device according to claim 5, wherein said respective photoelectric conversion element is formed of a photo-conductive material.

7. An optoelectronic display device including a matrix of semiconductor elements, each semiconductor element comprising:

a semiconductor substrate of a first conductivity type having first and second opposite surfaces;

a pair of diffused impurity regions of a conductivity type different from said first conductivity type diffused within and passing through said substrate to said first and second surfaces;

a substantially U-shaped resistive layer of a second conductivity type different from said first conductivity type diffused within said substrate between said impurity regions on said first and second sides of said substrate;

a first layer of said first conductivity type deposited in one end of said U-shaped resistive layer and being allowed therewith, so as to form a tunnel diode region, a photo-conductive region supported on said first side of said substrate and being connected therewith; and a first conductive path insulatingly supported on said first side of said substrate for connecting the other end of said U-shape resistive layer and one of said diffused impurity regions.

8. An optoelectronic device according to claim 7, further including a second conductive path insulatingly formed on said first side of said substrate and connecting the other of said diffused impurity regions with said tunnel diode.

9. An optoelectronic device according to claim 8, further including a third conductive path insulatingly formed on said first side of said substrate and connecting said substrate and said photo-conductive region.

10. An optoelectronic device according to claim 9, further including a second layer of said first conductivity type formed on said second side of said substrate over said other impurity region and a portion of the surface of said substrate;

a dense layer of said first conductivity type formed in said second layer; and a fourth conductive path insulatingly supported on said second side of said substrate and connecting said dense layer with the side of said one impurity region opposite the connection of said first conductive path.

11. An optoelectronic display device according to claim 10, wherein each of said conductive paths is insulatingly supported by a layer of insulation formed on said substrate.

12. An optoelectronic display device according to claim 11, further including a fifth conductive path contacting said one end of said U-shaped resistive layer adjacent said tunnel diode and extending beyond the surface of said insulation, so that an external connection can be applied thereto.

13. An optoelectronic display device according to claim 12, further including an aluminum shield disposed within said insulating layer on said first side of said substrate beneath said photo-conductive layer.

14. An optoelectronic display device according to claim 13, wherein said substrate is formed from a crystal selected from a group consisting of gallium-phosphide, gallium-arsenide, and a mixture of gallium-phosphide and gallium-arsenide.

15. An optoelectronic display device according to claim 14, wherein the impurity diffused in said impurity regions is selected from the group consisting of tellurium, selenium, and antimony.

16. An optoelectronic display device according to claim 15, wherein said second layer of said first conductivity type has zinc diffused therein to form said dense layer.

17. An optoelectronic display device according to claim 12, wherein ground potential is applied to said substrate, a positive potential is applied to said fifth conductive path and a negative potential is applied to said first conductive path.

* * * * *

UNITED STATES PATENT OFFICE
CERTIFICATE OF CORRECTION

Patent No. 3,659,159 Dated April 25, 1972

Inventor(s) Minoru NAGATA

It is certified that error appears in the above-identified patent and that said Letters Patent are hereby corrected as shown below:

Title Page, insert the following:

[73] Assignee: Hitachi, Limited,
Tokyo, Japan

Signed and sealed this 13th day of November 1973.

(SEAL)
Attest:

EDWARD M.FLETCHER,JR.
Attesting Officer

RENE D. TEGTMEYER
Acting Commissioner of Patents